United States Patent
Kanagasabai et al.

(12)

(10) Patent No.: US 7,346,491 B2
(45) Date of Patent: Mar. 18, 2008

(54) METHOD OF TEXT SIMILARITY MEASUREMENT

(75) Inventors: Rajaraman Kanagasabai, Singapore (SG); Hong Pan, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 381 days.

(21) Appl. No.: 10/250,746

(22) PCT Filed: Jan. 4, 2001

(86) PCT No.: PCT/SG01/00023

§ 371 (c)(1),
(2), (4) Date: Nov. 26, 2003

(87) PCT Pub. No.: WO02/054279

PCT Pub. Date: Jul. 11, 2002

(65) Prior Publication Data

US 2004/0088156 A1    May 6, 2004

(51) Int. Cl.
*G06F 15/62*    (2006.01)
(52) U.S. Cl. .......................... 704/9; 715/531
(58) Field of Classification Search ............... 704/9; 715/531
See application file for complete search history.

(56) References Cited

U.S. PATENT DOCUMENTS 5,293,552 A    3/1994    Aalbersberg ........... 364/419.19

(Continued)

FOREIGN PATENT DOCUMENTS

EP    0530993 A2    8/1992

(Continued)

OTHER PUBLICATIONS

Chris Buckley et al., *Automatic Routing and AD-hoc Retrieval Using SMART: Trec 2*, Text Retrieval Conference, Gaithersburg, MD., (Aug. 31-Sep. 2, 1993), <http://trec.nist.gov/pubs/trec2/papers/txt/04.text>.

*Primary Examiner*—Patrick N. Edouard
*Assistant Examiner*—E. Yen
(74) *Attorney, Agent, or Firm*—K. David Crockett, Esq.; Crockett & Crockett

(57) ABSTRACT

In one aspect, the present invention provides a for estimating the similarity between at least two portions of text including the steps of forming a set of syntactic tuples, each tuple including at least two terms and a relation betweeen the two terms; classifying the relation between the terms in the tuples according to a predefined set of relations; establishing the relative agreement between syntactic tuples from the portions of text under comparison according to predefined classes of agreement; calculating a value representative of the similarity between the portions of text of each of the classes of agreement; and establishing a value for the similarity between the portions of text by calculating a weighted sum of the values representative of the similarity between the portions of text for each of the classes of agreement. Preferaly, the step of calculating a value representative of the similarity between the portions of text for each of the classes of agreement includes a weighting based upon the number of matched terms occurring in particular parts of speech in which the text occurs. It is also preferred that the step of calculating a value representative of the similarity between the portions of text for each of the classes of agreement include the application of a weighting factor to the estimate of similarity for each of the classes of agreement and the parts of speech in which matched terms occur.

19 Claims, 1 Drawing Sheet

U.S. PATENT DOCUMENTS

| | | | |
|---|---|---|---|
| 5,297,039 A | 3/1994 | Kanaegami | 707/5 |
| 5,418,716 A * | 5/1995 | Suematsu | 704/9 |
| 5,519,608 A | 5/1996 | Kupiec | 364/419.08 |
| 5,619,709 A | 4/1997 | Caid et al. | 395/794 |
| 5,675,819 A | 10/1997 | Schuetze | 395/760 |
| 5,794,178 A | 8/1998 | Caid et al. | 704/9 |
| 5,799,312 A | 8/1998 | Rigoutsos | 707/103 |
| 5,835,905 A | 11/1998 | Pirolli et al. | 707/3 |
| 5,864,855 A | 1/1999 | Ruocco et al. | 707/10 |
| 5,893,095 A | 4/1999 | Jain et al. | 707/6 |
| 5,895,446 A * | 4/1999 | Takeda et al. | 704/2 |
| 5,895,470 A | 4/1999 | Pirolli et al. | 707/102 |
| 5,905,863 A * | 5/1999 | Knowles et al. | 709/206 |
| 5,933,822 A * | 8/1999 | Braden-Harder et al. | 707/5 |
| 5,943,669 A | 8/1999 | Numata | 707/5 |
| 5,966,686 A * | 10/1999 | Heidorn et al. | 704/9 |
| 6,076,051 A * | 6/2000 | Messerly et al. | 704/9 |
| 6,233,546 B1 * | 5/2001 | Datig | 704/7 |
| 6,678,679 B1 * | 1/2004 | Bradford | 707/5 |
| 6,871,174 B1 * | 3/2005 | Dolan et al. | 704/9 |

FOREIGN PATENT DOCUMENTS

EP     0687987 A1     6/1995

* cited by examiner

METHOD OF TEXT SIMILARITY MEASUREMENT

FIELD OF THE INVENTION

The present invention relates to an improved method for the measurement of text similarity based on syntactic relation vectors referred to in the specification as 3-tuples. The method may be used to measure the similarity or degree of overlap between two portions of text.

BACKGROUND OF THE INVENTION

Text similarity measurement generally refers to methods of determining the degree of overlap between two portions of text. These methods are usually implemented during a search for a document to judge how well a document matches a given search query. However, these methods may also be used in other information retrieval problems such as document clustering (to match two documents and decide whether they should be in the same cluster) and the classification of documents.

A method for determining the similarity of portions of text is the cosine measure. For this measure, the portions of text are assumed to be represented as vectors with terms as the coordinates after appropriate weighting. An estimate of similarity is determined as the cosine of the angle between the vectors. Often the cosine is calculated as the dot product of the vectors after normalization.

The cosine measure is generally considered to have advantageous properties such as fast computation and a symmetric and simple range of values [0,1]. However, with this method it is assumed that the terms are independent and each portion of text is simply treated as a 'bag of terms'.

As a result, the method is limited in its ability to accurately capture the degree of similarity between two portions of text.

Other methods for determining the similarity between two portions of text are available, however, they generally have the same above-mentioned disadvantage as the cosine measure.

Another type of method for determining the similarity between two portions of text uses the co-occurrence of term pairs in each of the portions. For this type of method, a co-occurrence thesaurus is first constructed from the text portions. This method captures all the co-occurring term pairs in the portions. In this type of method the similarity is determined by reference to the amount of overlap between co-occurring term pairs. Co-occurrence based measures capture some of the term dependencies, but this method can be used only if there is a sufficiently large portion of text available for the generation of a co-occurrence thesaurus or if the co-occurrence thesaurus is already available.

U.S. Pat. No. 5,297,039 (Kanaegami et.al) proposes a similarity measure using syntactic relations between the terms. Text is parsed first to extract an 'analysis to network' that consists of triplets of the form '(relation, element 1, element 2)'. The elements correspond to the nouns and the relation is a term (usually a verb) syntactically close to the elements 1 and 2. The similarity is measured by a sum of term agreements, pair agreements and line agreements between the corresponding analysis networks, after suitable weighting. Since the relations are themselves terms extracted from the text, this method does not overcome the problem of synonymity. Accordingly, it is difficult to calculate the term, pair and line agreements accurately.

The above discussion of documents, acts, materials, devices, articles or the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

In one aspect, the present invention provides a method for estimating the similarity between at least two portions of text including the steps of:

forming a set of syntactic tuples, each tuple including at least two terms and a relation between the two terms;

classifying the relation between the terms in the tuples according to a predefined set of relations;

establishing the relative agreement between syntactic tuples from the portions of text under comparison according to predefined classes of agreement;

calculating a value representative of the similarity between the portions of text for each of the classes of agreement; and establishing a value for the similarity between the portions of text by calculating a weighted sum of the values representative of the similarity between the portions of text for each of the classes of agreement.

Preferably, the step of calculating a value representative of the similarity between the portions of text for each of the classes of agreement includes a weighting based upon the number of matched terms occurring in particular parts of speech in which the text occurs.

It is also preferred that the step of calculating a value representative of the similarity between the portions of text for each of the classes of agreement include the application of a weighting factor to the estimate of similarity for each of the classes of agreement and the parts of speech in which matched terms occur.

The syntactic tuples may include two terms and a relation between the terms, the relation being classified according to one of the following classes:

relations between a verb and its subject;
relations between a verb and its object;
relations between a modifier and its modified word; or
a circumstantial relationship.

In a particularly preferred embodiment, the method includes tuples of the form (relation, term1, term2).

The improved method includes a number of advantages in that the method does not rely upon an assumption that the terms in the portions of text are independent. In addition, the method is not constrained by the number of relations and uses generic relations between the terms to determine the similarity between the portions of text with greater accuracy. Also, the improved method is not biased by the length of the portions of text that are to be compared.

BRIEF DESCRIPTION OF THE DRAWING

The invention will now be described in greater detail by reference to the attached drawing and to an Example. It is to be understood that the particularity of the drawing and the Example does not supersede the generality of the foregoing description of the invention.

DETAILED DESCRIPTION

Figure 1:
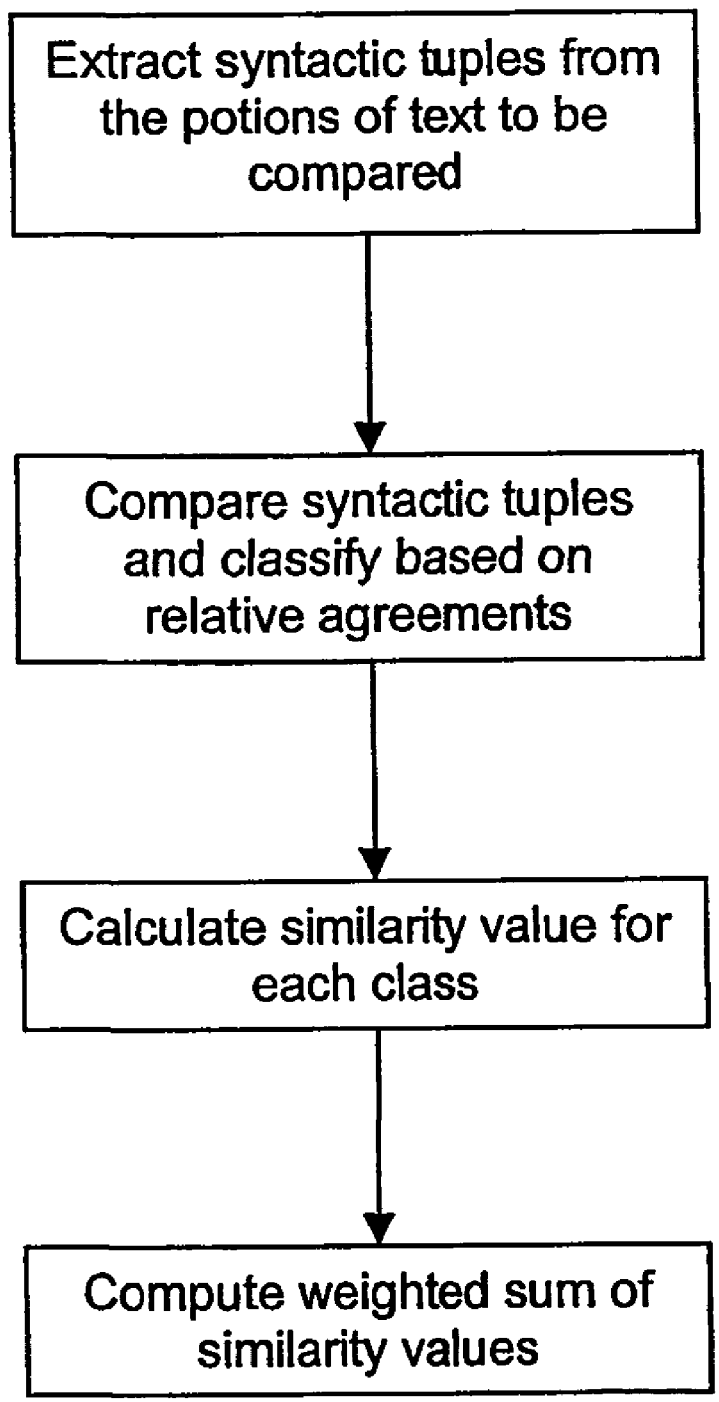
FIG. 1 is a flow chart showing the steps in the method of the invention.

The present invention will now be described in relation to the drawing and an Example. FIG. 1 shows the method of the invention in flowchart form. The method for estimating the similarity between at least two portions of text begins with the step of extracting a set of syntactic tuples, each tuple including at least two terms and a relation between the two terms. The extracted syntactic tuples are compared and classified based on relative agreements. A value representative of the similarity between the portions of text for each of the classes of agreement is calculated; and a value for the similarity between the portions of text is established by calculating a weighted sum of the values representative of the similarity between the portions of text for each of the classes of agreement.

EXAMPLE

In the Example, a method for determining the similarity of two portions of text is based upon the formation of syntactic tuples of the form "relation-term1l-term2", referred to as 3-tuples, where "term1" and "term2" are terms extracted from the portions of text to be compared and "relation" is a relationship between the terms.

Preferably, the "relation" is one of a pre-defined set of relations.

3-tuples for each of the portions of text to be compared may be extracted through a three step process including the following steps:

Text Pre-Processing

In this step, redundant parts in the portions of text, such as tabular data in appendices, are identified and removed.

Morphological Analysis

This particular step can be subdivided into a word analysis step followed by a lexical pattern matching step. Preferably, the word analysis step analyses each word in the portions of text using a set of dictionaries and a morphology grammar. Generally, each word in a dictionary is associated with a set of linguistic features.

The morphology grammar defines how phenomena such as punctuations and inflections are to be interpreted by the word analyser. The output of the word analysis step is a list of nodes each corresponding to a word in the portion of text under analysis and containing its linguistic features.

The lexical pattern matching step uses a set of dictionaries with each entry describing a particular word sequence pattern that is to be matched with the list of nodes output by the word analysis step. This step is used to locate domain terms, idioms and phrases in the portion of text.

Structural Analysis

In the Example, the patterns output from the morphological analysis step are considered as being related according to a set of predefined relationships as set out below:

ARG0: relations between a verb and its subject, or a subject in the parser tree of one sentence.
ARG1: relations between a verb and its object, or an object in the parser tree of one sentence.
ATTR: relations between a modifier and its modified word.
CICR: circumstantial relationship (relations other than the above).

The structural analysis step may proceed by initially representing the patterns as nodes and then constructing a directed acyclic graph of these nodes. The edges of this directed acyclic graph are extracted and become the 3-tuples for the purpose of this Example.

The relations in the 3-tuples are generic and are determined based upon a defined set of relations. Accordingly, even though the same "text meaning" may be expressed in different forms, they will be normalized into the same set of 3-tuples with this method.

Different Types of 3-Tuple Agreements

In the Example, three separate types of "agreement" between 3-tuples are defined. In this embodiment, they are referred to as Class A (full agreement), Class B (partial agreement) and Class C (term agreement). The following definitions are established for purposes of illustration:

Two portions of text, say $D_i$ and $D_j$, are represented by a vector of 3-tuples, that is:

$$D_i = \{T_{i1}, T_{i2}, \ldots, T_{in}\}, \text{ and}$$

$$D_j = \{T_{j1}, T_{j2}, \ldots, T_{jn}\},$$

where $$T_{i1} = \{T_{i1}.\text{relation}, T_{i1}.\text{term1}, T_{i1}.\text{Term2}\} \text{ and}$$

$$T_{j1} = \{T_{j1}.\text{relation}, T_{j1}.\text{term1}, T_{j1}.\text{Term2}\} \text{ are 3-tuples.}$$

The classes of agreement between 3-tuples are defined in the Example as follows:

Class A (Full Agreement)

In the Example, two 3-tuples are said to belong to "class A" if and only if they are identical.

i.e. $T_i$ and $T_j$ belong to class A if and only if $$(T_i.\text{relation}==T_j.\text{relation}) \text{ AND}$$

$$(T_i.\text{term1}==T_j.\text{term1}) \text{ AND}$$

$$(T_i.\text{term2}==T_j.\text{term2})$$

Class B (Partial Agreement)

In the Example, two 3-tuples are said to belong to "class B" if and only if exactly two of corresponding elements in the 3-tuples are identical.

i.e. $T_i$ and $T_j$ belong to class B if and only if $$((T_i.\text{relation}==T_j.\text{relation}) \text{ AND } (T_i.\text{term1}==T_j.\text{term1})$$
$$\text{AND } (T_i.\text{term2}!=T_j.\text{term2})) \text{ OR}$$

$$((T_i.\text{relation}==T_j.\text{relation}) \text{ AND } (T_i.\text{term1}!=T_j.\text{term1})$$
$$\text{AND } (T_i.\text{term2}==T_j.\text{term2})) \text{ OR}$$

$$((T_i.\text{relation}!=T_j.\text{relation}) \text{ AND } (T_i.\text{term1}==T_j.\text{term1})$$
$$\text{AND } (T_i.\text{term2}==T_j.\text{term2})) \text{ OR}$$

Class C (Term Agreement)

In the Example, two 3-tuples are said to belong to "class C" if and only if exactly one of the corresponding terms in the 3-tuples are identical.

i.e. $T_i$ and $T_j$ belong to class C if and only if $$((T_i.\text{relation}!=T_j.\text{relation}) \text{ AND } (T_i.\text{term1}==T_j.\text{term1})$$
$$\text{AND } (T_i.\text{term2}!=T_j.\text{term2})) \text{ OR}$$

$$((T_i.\text{relation}!=T_j.\text{relation}) \text{ AND } (T_i.\text{term1}!=T_j.\text{term1})$$
$$\text{AND } (T_i.\text{term2}==T_j.\text{term2}))$$

Preferably, when terms are matched, they are differentiated based on the Part of Speech (POS) in which the terms occur. In the Example, there are three definitions for POS which are ultimately used in the overall measure of similarity between portions of text.

POS1 (Part of Speech 1)

In the Example, two 3-tuples are categorised as POS1 if the POS of each matching term is a "NOUN", that is:

($T_i$.term1==$T_j$.term1) AND ($T_i$.term1.POS==NOUN AND
$T_j$.term1.POS==NOUN)

AND ($T_i$.term2==$T_j$.term2) AND ($T_i$.term2.POS==NOUN AND
$T_j$.term2.POS==NOUN)

POS2 (Part of Speech 2)

In the Example, two 3-tuples are categorised as POS2 if the POS of exactly one matching term is a "NOUN", that is:

(($T_i$.term1==$T_j$.term1) AND ($T_i$.term1.POS==NOUN AND
$T_j$.term1.POS==NOUN)

AND ($T_i$.term2==$T_j$.term2) AND ($T_i$.term2.POS!=NOUN OR $T_j$.term2.POS!=NOUN))

OR (($T_i$.term1==$T_j$.term1) AND ($T_i$.term1.POS!=NOUN OR $T_j$.term1.POS!=NOUN)

AND ($T_i$.term2==$T_j$.term2) AND ($T_i$.term2.POS==NOUN AND
$T_j$.term2.POS==NOUN))

POS3 (Part of Speech 3)

In the Example, two 3-tuples are categorised as POS3 if they neither belong to POS1 nor POS2.

Based upon the definitions set out above, a similarity measure in the Example is established as follows:

Two portions of text that will undergo a similarity comparison have 3-tuple vectors formed which are referred to as $D_i$ and $D_j$, which may be represented as:

$D_i = \{T_{i1}, T_{i2}, \ldots, T_{iNi}\}$ and $D_j = \{T_{j1}, T_{j2}, \ldots, T_{jNj}\}$ where $N_i$ and $N_j$ are the length of vectors $D_i$ and The number of 3-tuples that match according to the Class A definition may be represented as nA. Similarly, nB and nC may be used to represent the number of 3-tuples matching according to Class B and Class C definitions respectively. In the Example, if a 3-tuple occurs two or more times, the count is taken to be the minimum of the number of times it occurs in $D_i$ and $D_j$.

If $nA_i$, (i=1,2,3) is used to represent the number of 3-tuples satisfying both Class A and POSi, (i=1,2,3), then $nA_1+nA_2+nA_3=nA$. Similarly, by using $nB_i$ and $nC_i$, (i=1, 2,3) to represent the number of 3-tuples satisfying both Class B and POSi and Class C and POSi respectively, then measures ($sim_A$, $sim_B$ and $sim_C$) that may be used to determine the amount of overlap in terms of $nA_i$, $nB_i$ and $nC_i$, may be stated as:

$$sim_A(D_i, D_j) = \frac{\sum_{i=1}^{3} nA_i \cdot w_i}{\min(N_i, N_j)}$$

$$sim_B(D_i, D_j) = \frac{\sum_{i=1}^{3} nB_i \cdot w_i}{3 \cdot \min(N_i, N_j)}$$

$$sim_C(D_i, D_j) = \frac{\sum_{i=1}^{3} nC_i \cdot w_i}{2 \cdot \min(N_i, N_j)}$$

where $w_1$, $w_2$ and $w_3$ are weightings corresponding to the POS1, POS2 and POS3 matchings respectively, such that $w_1+w_2+w_3=1.00$ and $w_1 \geq w_2 \geq w_3$.

It will be recognised by persons skilled in the art that $sim_C(D_i,D_j)$ provides a measure of the overlap of terms, $sim_B(D_i,D_j)$ provides a measure of the overlap of lexically close pairs (relations and terms) and $sim_A(D_i,D_j)$ provides a measure of the overlap of 3-tuples.

It will also be recognised that these measures used in the Example are normalised (ie they take values in the range of (0,1) with identical portions of text having a value of 1 and portions having no matched 3-tuples having a value of 0. In addition, it should be noted that these measures are symmetric.

In the Example, a weighted sum of these measures is calculated as follows;

$sim(D_i,D_j) = w_a \times sim_A(D_i,D_j) + w_b \times sim_B(D_i,D_j) + w_c \times sim_C(D_i,D_j)$ In the calculation of the weighted sum in the Example, the weights are chosen such that $w_a+w_b+w_c=1.0$ and $w_a > w_b \geq w_c$ (for eg, $w_a=½$, $w_b=⅓$, and $w_c=⅙$. Hence this gives rise to a class of measures for various choices of weights.

As the three measures $sim_A$, $sim_B$ and $sim_C$ compute the overlap respectively with decreasing accuracy, the choice of decreasing weighting factors in the Example is warranted.

The weighted sum provides a measure of the similarity between two portions of text that can compute text similarity accurately and without any requirement for an external dictionary or thesaurus.

Finally, It will be appreciated that there may be other modifications and alterations made to the configurations described herein that are also within the scope of the present invention.

The invention claimed is:

1. A method for estimating the similarity between at least two portions of text, said method comprising the steps of:
   receiving said at least two portions of text;
   forming a set of syntactic tuples from said portions of text, each tuple comprising two terms and a relation between the two terms;
   classifying the relation between the terms in the tuples according to a predefined set of relations;

predefining classes of agreement between tuples under comparison, comprising a class of full agreement wherein tuples under comparison are identical, a class of partial agreement wherein only two of corresponding elements in tuples under comparison are identical, and a class of term agreement wherein only one of corresponding terms in tuples under comparison are identical;

determining a respective class of relative agreement between each pair of syntactic tuples from the portions of text under comparison according to the predefined classes of agreement;

calculating a value representative of the similarity between the portions of text for each of the classes of agreement, based on the plurality of tuples determined to belong to the respective class of agreement; and determining and outputting a measure of the similarity between the portions of text by calculating a weighted sum of the values representative of the similarity between the portions of text for each of the classes of agreement.

2. A method according to claim 1 wherein the step of calculating a value representative of the similarity between the portions of text for each of the classes of agreement comprises a weighting based upon the number of matched terms occurring in particular parts of speech.

3. A method according to claim 2 wherein the step of calculating a value representative of the similarity between the portions of text for each of the classes of agreement comprises the application of a weighting factor to the estimate of similarity for each of the classes of agreement and the parts of speech in which matched terms occur.

4. A method according to claim 1 wherein the syntactic tuples comprise two terms and a relation between the terms, the relation being classified according to one of the following classes:

relations between a verb and its subject;
relations between a verb and its object;
relations between a modifier and its modified word; or
a circumstantial relationship.

5. A method according to claim 1 wherein the syntactic tuples are of the form (relation, term1, term2).

6. A method according to claim 5 wherein a syntactic tuple of a first portion of text, $T_i$, and a syntactic tuple of a second portion of text, $T_j$, are associated with the class of full agreement of syntactic tuples, class A, if and only if:

$(T_i.\text{relation}==T_j.\text{relation})$ AND $(T_i.\text{term1}==T_j.\text{term1})$ AND $(T_i.\text{term2}==T_j.\text{term2})$.

7. A method according to claim 6 wherein a syntactic tuple of a first portion of text, $T_i$, and a syntactic tuple of a second portion of text, $T_j$, are associated with the class of partial agreement of syntactic tuples, class B, if and only if:

$((T_i.\text{relation}==T_j.\text{relation})$ AND $(T_i.\text{term1}==T_j.\text{term1})$ AND $(T_i.\text{term2}!=T_j.\text{term2}))$ OR $((T_i.\text{relation}==T_j.\text{relation})$ AND $(T_i.\text{term1}!=T_j.\text{term1})$ AND $(T_i.\text{term2}==T_j.\text{term2}))$ OR $((T_i.\text{relation}!=T_j.\text{relation})$ AND $(T_i.\text{term1}==T_j.\text{term1})$ AND $(T_i.\text{term2}==T_j.\text{term2}))$.

8. A method according to claim 7 wherein a syntactic tuple of a first portion of text, $T_i$, and a syntactic tuple of a second portion of text, $T_j$, are associated with the class of term agreement of syntactic tuples, class C, if and only if:

$((T_i.\text{relation}!=T_j.\text{relation})$ AND $(T_i.\text{term1}==T_j.\text{term1}))$ AND $(T_i.\text{term2}!=T_j.\text{term2})$ OR $((T_i.\text{relation}!=T_j.\text{relation})$ AND $(T_i.\text{term1}!=T_j.\text{term1}))$ AND $(T_i.\text{term2}==T_j.\text{term2})$.

9. A method according to claim 8 wherein a syntactic tuple of a first portion of text, $T_i$, and a syntactic tuple of a second portion of text, $T_j$, are associated with a class of a part of speech, POS1, if the part of speech of each matching term in the syntactic tuples is a noun, namely, if:

$(T_i.\text{term1}==T_j.\text{term1})$ AND $(T_i.\text{term1.POS}==\text{NOUN}$ AND $T_j.\text{term1.POS}==\text{NOUN})$

AND $(T_i.\text{term2}==T_j.\text{term2})$ AND $(T_i.\text{term2.POS}==\text{NOUN}$ AND $T_j.\text{term2.POS}==\text{NOUN})$.

10. A method according to claim 9 wherein a syntactic tuple of a first portion of text, $T_i$, and a syntactic tuple of a second portion of text, $T_j$, are associated with a class of a part of speech, POS2, if the part of speech of one, and only one, matching term in the syntactic tuples is a noun, namely, if:

$((T_i.\text{term1}==T_j.\text{term1})$ AND $(T_i.\text{term1.POS}==\text{NOUN}$ AND $T_j.\text{term1.POS}==\text{NOUN})$

AND $(T_i.\text{term2}==T_j.\text{term2})$ AND $(T_i.\text{term2.POS}!=\text{NOUN}$ OR $T_j.\text{term2.POS}!=\text{NOUN}))$

OR $((T_i.\text{term1}==T_j.\text{term1})$ AND $(T_i.\text{term1.POS}!=\text{NOUN}$ OR $T_j.\text{term1.POS}!=\text{NOUN})$

AND $(T_i.\text{term1}==T_j.\text{term1})$ AND $(T_i.\text{term1.POS}==\text{NOUN}$ AND $T_j.\text{term1.POS}==\text{NOUN})$.

11. A method according to claim 10 wherein a syntactic tuple of a first portion of text, $T_i$, and a syntactic tuple of a second portion of text, $T_j$, are associated with a class of a part of speech, POS3, if they are not associated with either class POS1 or POS2.

12. A method according to claim 11 wherein the step of calculating a value representative of the similarity between the portions of text for each of the classes of agreement comprises a weighting based upon the number of matched terms occurring in particular parts of speech, the calculation of the value for Class A comprising parameters relating to the number of matching syntactic tuples according to Class A and POS1, $nA_1$, the number of matching syntactic tuples according to Class A and POS2, $nA_2$, and the number of matching syntactic tuples according to Class A and POS3, $nA_3$, and separate weighting factors $w_1$, $w_2$ and $w_3$ also being applied to the POS1, POS2 and POS3 matchings, the value, $sim_A(D_i,D_j)$, being calculated as:

$$sim_A(D_i, D_j) = \frac{\sum_{i=1}^{3} nA_i \cdot w_i}{\min(N_i, N_j)}$$

where $\min(N_i,N_j)$ represents the lesser value of the two lengths of the vectors of syntactic tuples formed for the portions of text $D_i$ and $D_j$, respectively.

13. A method according to claim 12 wherein the step of calculating a value representative of the similarity between the portions of text for each of the classes of agreement comprises a weighting based upon the number of matched terms occurring in particular parts of speech, the calculation of the value for Class B comprising parameters relating to the number of matching syntactic tuples according to Class B and POS1, $nB_1$, the number of matching syntactic tuples according to Class B and POS2, $nB_2$, and the number of matching syntactic tuples according to Class B and POS3, $nB_3$, and separate weighting factors $w_1$, $w_2$ and $w_3$ also being applied to the POS1, POS2 and POS3 matchings, the value, $sim_B(D_i,D_j)$, being calculated as:

$$sim_B(D_i, D_j) = \frac{\sum_{i=1}^{3} nB_i \cdot w_i}{3 \cdot \min(N_i, N_j)}$$

where $\min(N_i,N_j)$ represents the lesser value of the two lengths of the vectors of syntactic tuples formed for the portions of text $D_i$ and $D_j$ respectively.

14. A method according to claim 13 wherein the step of calculating a value representative of the similarity between the portions of text for each of the classes of agreement comprises a weighting based upon the number of matched terms occurring in particular parts of speech, the calculation of the value for Class C comprising parameters relating to the number of matching syntactic tuples according to Class C and POS1, $nC_1$, the number of matching syntactic tuples according to class C and POS2, $nC_2$, and the number of matching syntactic tuples according to Class C and POS3, $nC_3$, and separate weighting factors $w_1$, $w_2$ and $w_3$ also being applied to the POS1, POS2 and POS3 matchings, the value, $sim_C(D_i,D_j)$, being calculated as:

$$sim_C(D_i, D_j) = \frac{\sum_{i=1}^{3} nC_i \cdot w_i}{2 \cdot \min(N_i, N_j)}$$

where $\min(N_i, N_j)$ represents the lesser value of the two lengths of the vectors of syntactic tuples formed for the portions of text $D_i$ and $D_j$ respectively.

15. A method according to claim 12 wherein the weighting factors, $w_1$, $w_2$ and $w_3$ are such that:

$w_1+w_2+w_3=1.00$ and $w_1 \geq w_2 \geq w_3$.

16. A method according to claim 13 wherein the weighting factors, $w_1$, $w_2$ and $w_3$ are such that:

$w_1+w_2+w_3=1.00$ and $w_1 \geq w_2 \geq w_3$.

17. A method according to claim 14 wherein the weighting factors, $w_1$, $w_2$ and $w_3$ are such that:

$w_1+w_2+w_3=1.00$ and $w_1 \geq w_2 \geq w_3$.

18. A method according to claim 17 wherein the step of determining and outputting a measure of the similarity between the portions of text by calculating a weighted sum of the values representative of the similarity between the portions of text for each of the classes of agreement, $sim(D_i,D_j)$, is calculated as:

$sim(D_i,D_j)=w_a \times sim_A(D_i,D_j)+w_b \times sim_B(D_i,D_j)+w_c \times sim_C(D_i,D_j)$ where $w_a$, $w_b$ and $w_c$ are weighting factors.

19. A method according to claim 18 wherein the weighting factors, wa, wb and wc are such that:

$w_a+w_b+w_c=1.0$ and $w_a \geq w_b \geq w_c$.

* * * * *